(12) United States Patent
Ito et al.

(10) Patent No.: US 11,774,814 B2
(45) Date of Patent: Oct. 3, 2023

(54) DISPLAY DEVICE AND WATCH

(71) Applicant: Japan Display Inc., Tokyo (JP)

(72) Inventors: Kaoru Ito, Tokyo (JP); Akihiko Fujisawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/521,110

(22) Filed: Nov. 8, 2021

(65) Prior Publication Data

US 2022/0146894 A1 May 12, 2022

(30) Foreign Application Priority Data

Nov. 9, 2020 (JP) ................... 2020-186585

(51) Int. Cl.
*G02F 1/1362* (2006.01)
*G04G 21/08* (2010.01)
*G06F 3/041* (2006.01)
*G06F 3/044* (2006.01)

(52) U.S. Cl.
CPC .. *G02F 1/136218* (2021.01); *G02F 1/136286* (2013.01); *G04G 21/08* (2013.01); *G06F 3/0412* (2013.01); *G06F 3/044* (2013.01)

(58) Field of Classification Search
CPC ......... G02F 1/133555; G02F 1/133553; G02F 1/136218; G02F 2203/09; G06F 3/0412; G06F 3/044; G06F 3/0445; G04G 21/08; G04G 9/0023; G04G 9/0047; G04G 9/0064
See application file for complete search history.

(56) References Cited

U.S. PATENT DOCUMENTS

| | | | | |
|---|---|---|---|---|
| 2001/0038432 | A1* | 11/2001 | Yanagawa | G02F 1/1362 349/141 |
| 2015/0144920 | A1* | 5/2015 | Yamazaki | G06F 1/1652 257/40 |
| 2017/0031488 | A1* | 2/2017 | Shim | G06F 3/044 |
| 2017/0358769 | A1* | 12/2017 | Kim | H10K 59/1213 |
| 2019/0095008 | A1 | 3/2019 | Murata et al. | |

FOREIGN PATENT DOCUMENTS

JP 2019-061563 A 4/2019

\* cited by examiner

*Primary Examiner* — Angela K Davison
(74) *Attorney, Agent, or Firm* — K&L Gates LLP

(57) ABSTRACT

According to one embodiment, a display device includes a plurality of detection electrodes, a first shield electrode and a second shield electrode. The plurality of detection electrodes are disposed in a peripheral area surrounding a display area configured to display an image. The first shield electrode is disposed on a first substrate and in at least the peripheral area, the first shield electrode having a predetermined fixed potential. The second shield electrode is disposed on a second substrate and in at least the peripheral area, the second shield electrode having the predetermined fixed potential. The first shield electrode and the second shield electrode are disposed, in a plan view, on a side of the display area with respect to each of the detection electrodes.

9 Claims, 17 Drawing Sheets

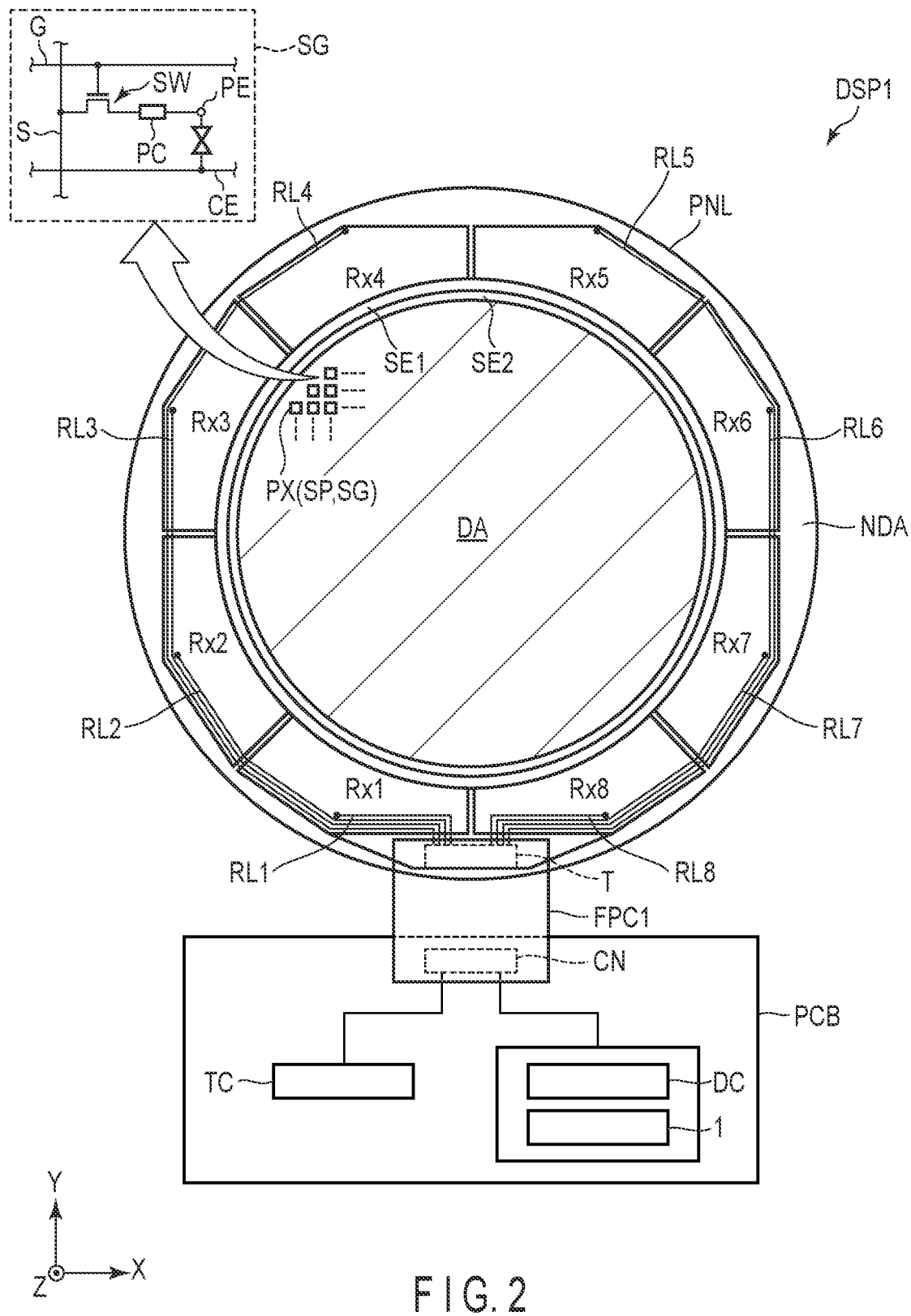
F I G. 2

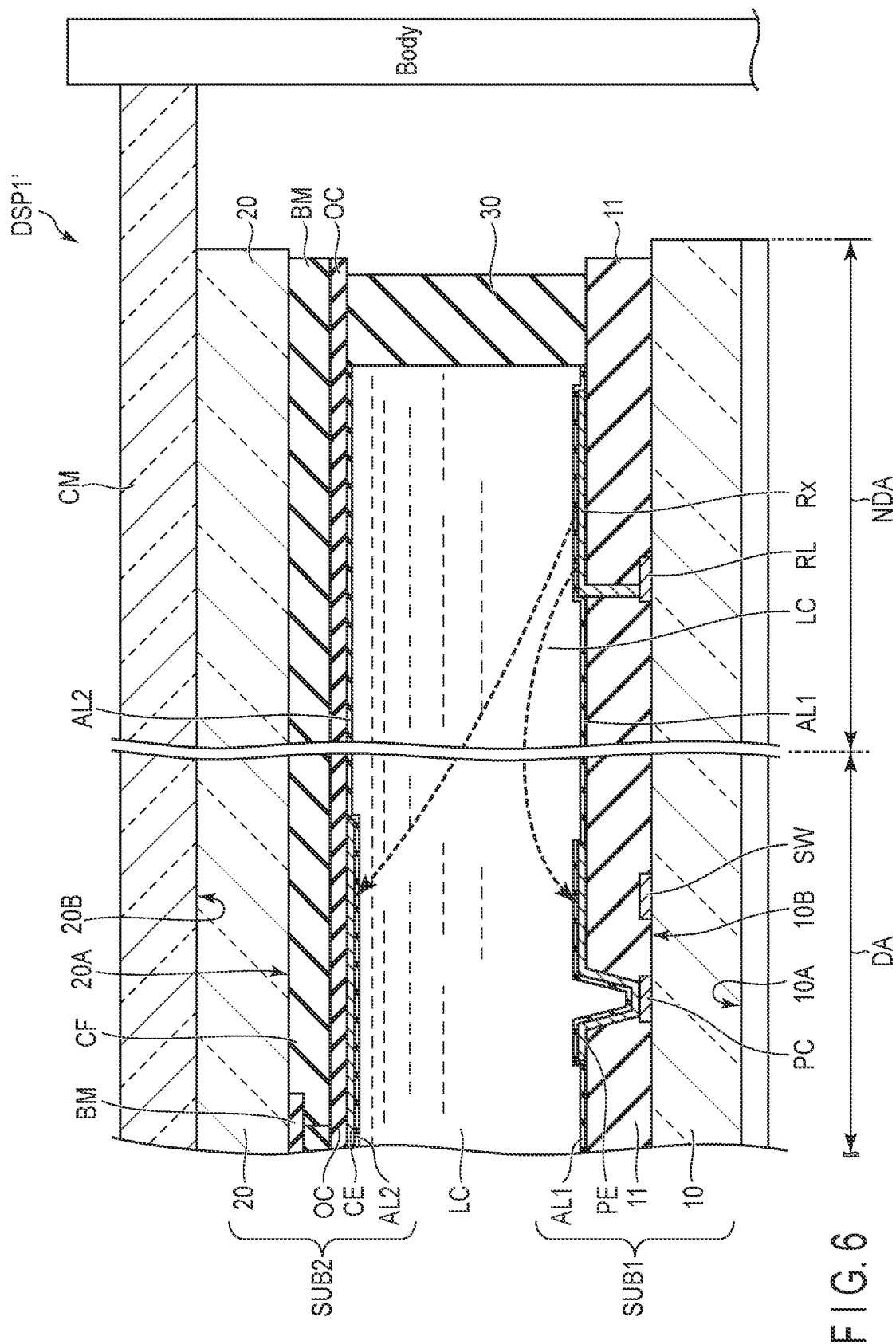
F I G. 6

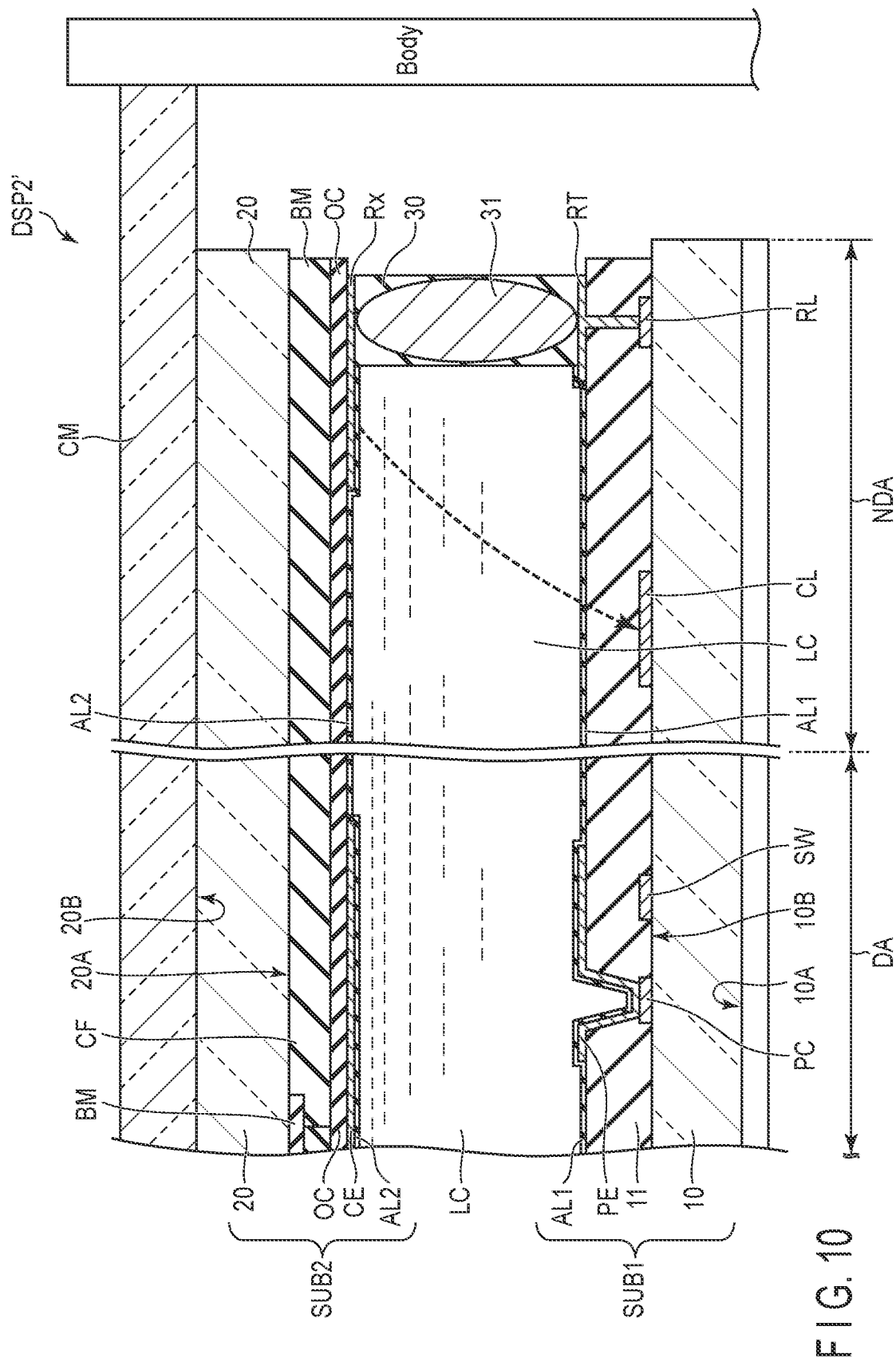
F I G. 10

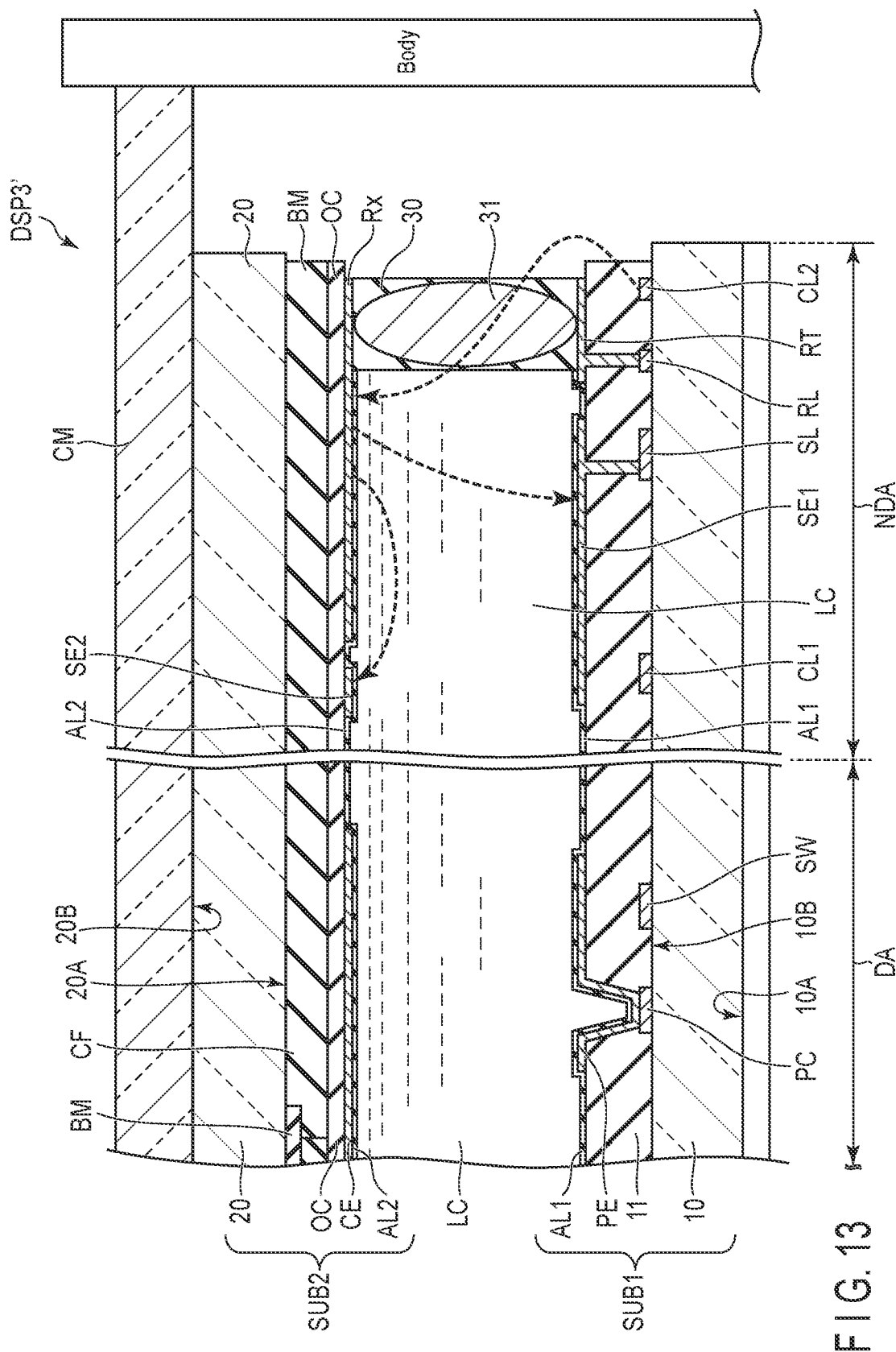
F I G. 13

DISPLAY DEVICE AND WATCH

CROSS-REFERENCE TO RELATED APPLICATIONS

This application is based upon and claims the benefit of priority from Japanese Patent Application No. 2020-186585, filed Nov. 9, 2020, the entire contents of which are incorporated herein by reference.

FIELD

Embodiments described herein relate generally to a display device and a watch.

BACKGROUND

In recent years, wearable devices with a touch detection function (e.g., wristwatch-type wearable devices, eyeglass-type wearable devices, etc.) have gradually been becoming popular. In such wearable devices, there is a need for both display quality when displaying images and excellent operability by touch, and various developments are progressing.

BRIEF DESCRIPTION OF THE DRAWINGS

FIG. 2 is a plan view of another structural example of the display device of the first embodiment.

FIG. 6 is a cross-section view of the structural example of a display device of a comparative example.

FIG. 10 is a cross-sectional view of a structural example of a display device of a comparative example.

FIG. 13 is a cross-sectional view of a structural example of a display device of a comparative example.

DETAILED DESCRIPTION

Figure 1:
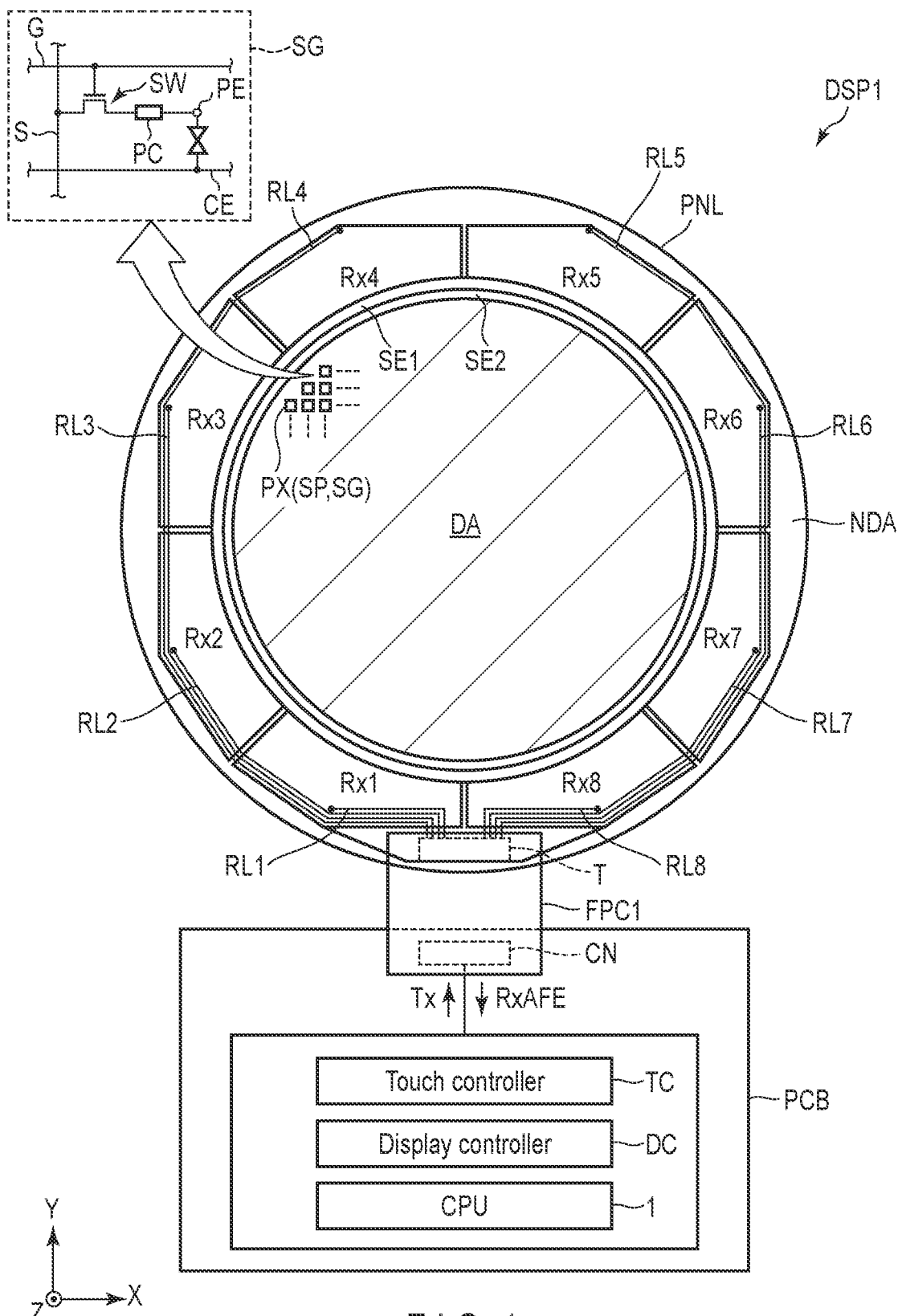
FIG. 1 is a plan view of a structural example of a display device of a first embodiment.

In general, according to one embodiment, a display device includes a first substrate, a second substrate, a liquid crystal layer, a plurality of detection electrodes, a first shield electrode and a second shield electrode. The second substrate is opposed to the first substrate. The liquid crystal layer is held between the first substrate and the second substrate. The plurality of detection electrodes are disposed in a peripheral area surrounding a display area configured to display an image. The first shield electrode is disposed on the first substrate and in at least the peripheral area, the first shield electrode having a predetermined fixed potential. The second shield electrode is disposed on the second substrate and in at least the peripheral area, the second shield electrode having the predetermined fixed potential. The first shield electrode and the second shield electrode are disposed, in a plan view, on a side of the display area with respect to each of the detection electrodes.

According to another embodiment, a watch includes the display device.

According to another embodiment, a display device includes a first substrate, a second substrate, a liquid crystal layer, a plurality of detection electrodes and a first shield electrode. The second substrate is opposed to the first substrate. The liquid crystal layer is held between the first substrate and the second substrate. The plurality of detection electrodes are disposed in the second substrate side, and in a peripheral area surrounding a display area configured to display an image. The first shield electrode is disposed on the first substrate and in at least the peripheral area, the first shield electrode having a predetermined fixed potential. The display device includes, in a plan view, a space of 50 to 200 μm width between the each of the detection electrodes and the display area. The first shield electrode is disposed, in a plan view, on a side of the display area with respect to each of the detection electrodes.

According to another embodiment, a display device includes a first substrate, a second substrate, a liquid crystal layer, a plurality of detection electrodes and a plurality of circuit wirings. The second substrate is opposed to the first substrate. The liquid crystal layer is held between the first substrate and the second substrate. The plurality of detection electrodes are disposed in a peripheral area surrounding a display area configured to display an image. The plurality of circuit wirings are disposed on the first substrate, and in the peripheral area. The display device includes a third shield electrode with a space of 50 to 200 μm width or a predetermined fixed potential between a circuit wiring positioned in the outermost out of the circuit wirings and the outermost edge of a sealant to adhere the first substrate and the second substrate.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

In embodiments, a display device with a touch detection function will be explained as an example of the display device. Touch detection methods are, for example, optical type, resistive type, capacitive method, electromagnetic induction type, and the like. Among the aforementioned touch detection methods, the capacitive type method is a detection method using a change in the capacitance caused by approaching or touching object (for example, a finger), which can be thus realized with a relatively simple structure, and can be operated with less power. In the embodiments, a capacitive type display device with a touch detection function will be explained.

Note that the capacitive type method includes a mutual capacitive type in which a field is generated between a pair of transfer electrode (drive electrode) and receiver electrode (detection electrode) arranged to be apart from each other, and a change in the field according to an approaching or touching object is sensed, and a self-capacitive type in which a single electrode is used to detect a change in the capacitance according to an approaching or touching object. In the embodiments, a self-capacitive type display device with a touch detection function will be mainly explained.

First Embodiment

FIG. 1 is a plan view of a liquid crystal display device DSP according to an embodiment. For example, a first direction X, a second direction Y and a third direction Z are orthogonal to each other, but may intersect at an angle other than ninety degrees. The first direction X and the second direction Y correspond to directions parallel to a main surface of a substrate which constitutes the display device DSP, and the third direction Z corresponds to a thickness direction of the display device DSP. In the following descriptions, a direction forwarding a tip of an arrow indicating the third direction Z is referred to as "upward" and a direction forwarding oppositely from the tip of the arrow is referred to as "downward". Supposing an observation position for observing the liquid crystal display DSP on a tip side of the arrow indicating the third direction Z, viewing from the observation position toward the X-Y plane defined by the first direction X and the second direction Y is referred to as "plan view".

As in FIG. 1, a display device DSP1 includes a display panel PNL, flexible circuit board FPC1, and circuit substrate PCB. The display panel PNL and the circuit board PCB are electrically connected via the flexible circuit board FPC1. Specifically, a terminal T of the display panel PNL and a connector CN of the circuit board PCB are electrically connected via the flexible circuit board FPC1.

The display panel PNL includes a display area DA configured to display an image and a bezel-like non-display area NDA surrounding the display area DA. The display area DA may be referred to as a display portion. Furthermore, the non-display area NDA may be referred to as a peripheral area or a peripheral portion. The display area DA includes pixels PX. Specifically, in the display area DA, a plurality of pixels PX are arranged in a matrix along the first direction X and the second direction Y. In the embodiments, a pixel PX includes red (R), green (G), and blue (B) subpixels SP. Furthermore, each subpixel SP includes a plurality of segment pixels SG. Each segment pixel SG includes pixel electrodes of different areas, and by switching display/non-display of the segment pixels SG, the gradation is set for each subpixel SP.

Of a plurality of concentric circles of FIG. 1, the area represented by the innermost circle corresponds to the display area DA, and the area between the outermost circle and the innermost circle corresponds to the non-display area NDA. Note that, in the present embodiment, the display area DA is circular and the non-display area NDA surrounding the display area DA is shaped similarly; however, the display area DA may not be circular, and the non-display area NDA may be shaped differently from the display area DA. For example, the display area DA and the non-display area NDA may be polygonal. Or, the display area DA is polygonal, and the non-display part NDA may be shaped circular which is different from the display area DA.

As in FIG. 1, in the non-display area NDA, a plurality of detection electrodes Rx1 to Rx8 are arranged to surround the display area DA. In the example of FIG. 1, eight detection electrodes Rx1 to Rx8 are shown; however, the number of the detection electrodes arranged in the non-display part NDA is not limited thereto, and any optional number of detection electrodes Rx may be arranged to surround the display area DA. The detection electrodes Rx1 to Rx8 are electrically connected to a terminal T disposed in the non-display area NDA via Rx wirings RL1 to RL8. Note that, in FIG. 1, the Rx wirings RL1 to RL8 are shaped to be along the outer peripheral of the detection electrodes Rx1 to Rx8; however, the shape of the Rx wirings RL1 to RL8 may be different. The Rx wirings RL1 to RL8 are used to supply a drive signal Tx to the detection electrodes Rx1 to Rx8, and to output detection signals RxAFE1 to RxAFE8 from the detection electrodes Rx1 to Rx8.

As in FIG. 1, the non-display area NDA includes a first shield electrode SE1 and a second shield electrode SE2 arranged to surround the display area DA. Specifically, the first shield electrode SE1 and the second shield electrode SE2 are arranged, in a plan view, between the display area DA and the detection electrodes Rx1 to Rx8. In FIG. 1, the first shield electrode SE1 is arranged on an outer side of the second shield electrode SE2; however, the second shield electrode SE2 may be arranged on an outer side of the first shield electrode SE1 instead. Furthermore, in FIG. 1, one first shield electrode SE1 and one second shield electrode SE2 are shown; however, the number of the first and second shield electrodes SE1 and SE2 arranged in the non-display area NDA is not limited thereto, and a plurality of first and second shield electrodes SE1 and SE2 may be arranged, in a plan view, between the display area DA and the detection electrodes Rx1 to Rx8 in a divided manner. In that case, the first shield electrodes SE1 arranged in a divided manner will be electrically connected to each other via wirings which are not shown. Furthermore, the second shield electrodes SE2 will be electrically connected to each other via wirings which are not shown. To the first shield electrode SE1 and the second shield electrode SE2, a GND voltage (the same potential as with the detection electrode Rx) or a predetermined direct current voltage (fixed voltage) is applied.

As shown in FIG. 1 in an enlarged manner, a segment pixel SG includes a switching element SW, pixel circuit PC, pixel electrode PE, common electrode CE, and liquid crystal layer LC, for example. The switching element SW is formed of, for example, a thin film transistor (TFT), and is electrically connected to a scan line G and a signal line S. The scan line G is electrically connected to the switching element SW of each of the segment pixels SG arranged in the first direction X. The signal line S is electrically connected to the switching element SW of each of the segment pixels SG arranged in the second direction Y. The pixel electrode PE is electrically connected to the switching element SW via the pixel circuit PC. Each of the pixel electrodes PE is opposed to the common electrode CE and drives the liquid crystal layer LC with a field generated between the pixel electrode PE and the common electrode CE. Note that, in the present embodiment, the pixel electrode PE is electrically connected to the switching element SW via the pixel circuit PC; however, the pixel electrode PE may be electrically connected to the switching element SW without the pixel circuit PC interposed therebetween.

As in FIG. 1, the circuit substrate PCB includes a touch controller TC, display controller DC, and CPU 1, for example. The touch controller TC outputs the drive signal Tx to the detection electrodes Rx1 to Rx8 arranged in the display panel PNL, and receives the detection signals (RxAFE signals) from the detection electrodes Rx1 to Rx8 (that is, the touch controller TC detects an external close object approaching or contacting thereto). The touch controller TC may be referred to as a sensor. The display controller DC outputs an image signal to display an image in the display area DA of the display panel PNL. The CPU 1 outputs a synch signal defining an operation time of the touch controller TC or the display controller DC, and executes an operation corresponding to touching detected by the touch controller TC.

Figure 3:
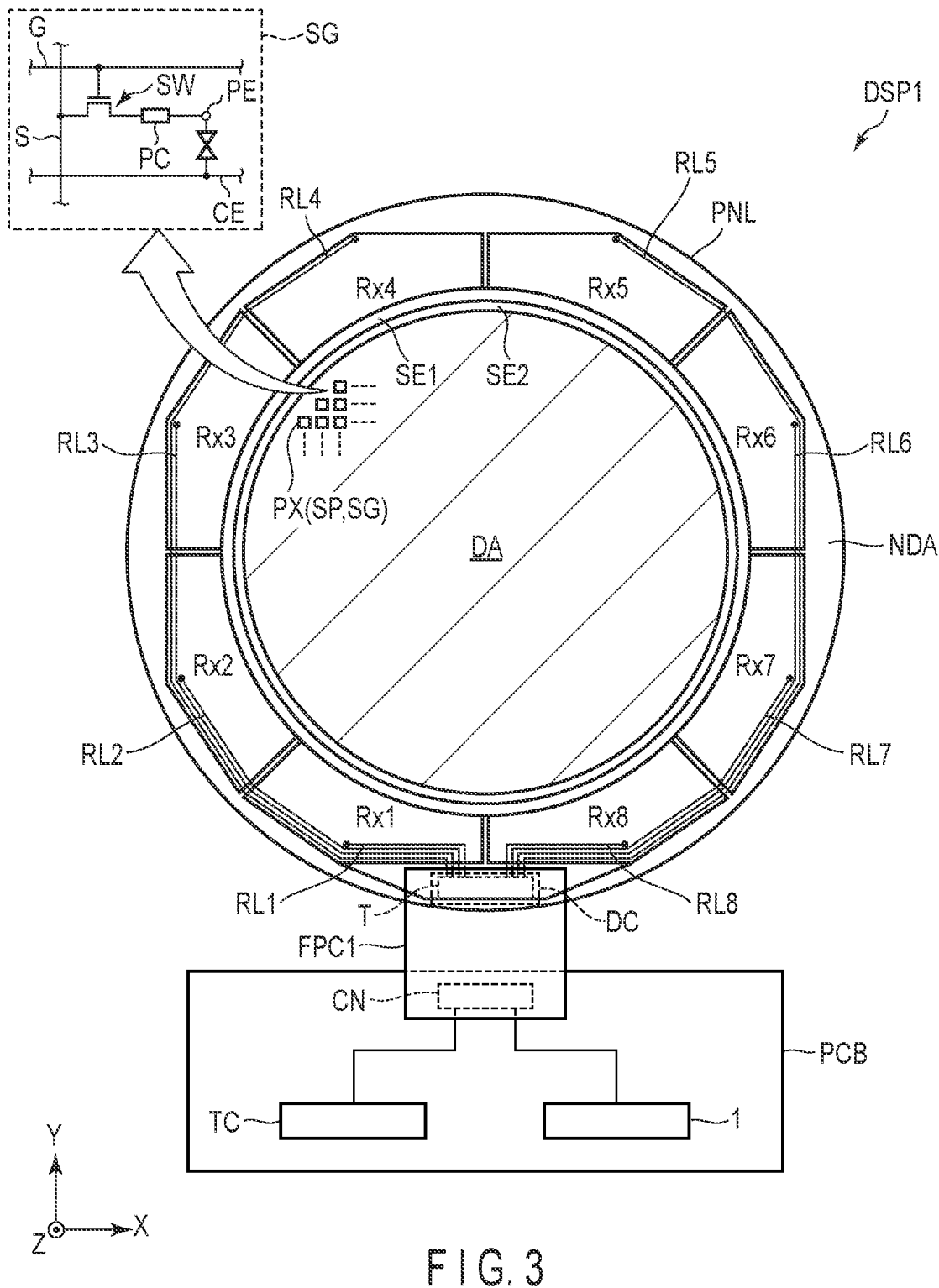
FIG. 3 is a plan view of another structural example of the display device of the first embodiment.
Figure 4:
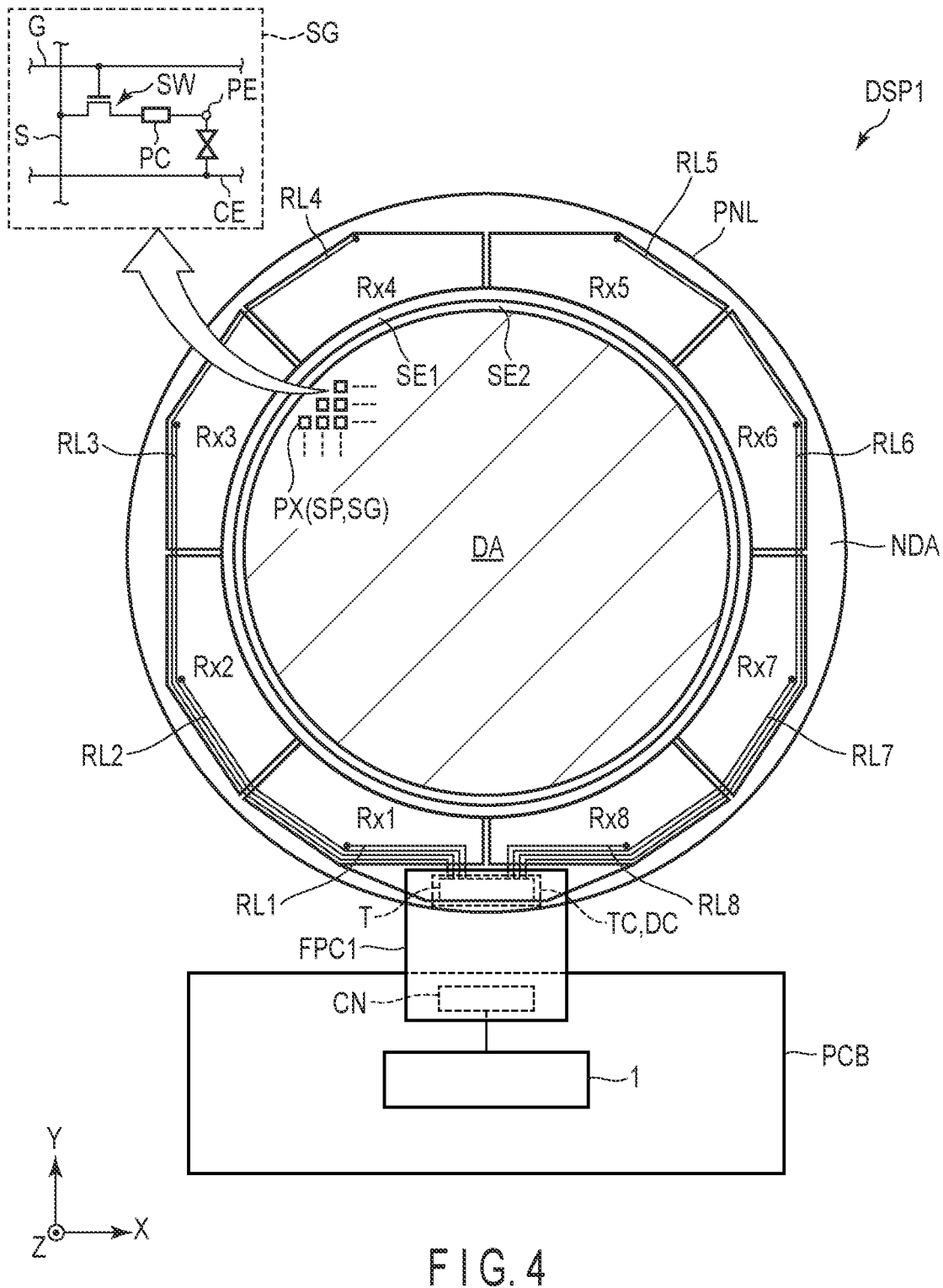
FIG. 4 is a plan view of another structural example of the display device of the first embodiment.

Note that, in FIG. 1, the touch controller TC, display controller DC, and CPU 1 are realized as one semiconductor chip; however, no limitation to the embodiments is intended thereby, and as in FIG. 2, the touch controller TC may be independently divided, and each component may be mounted on the circuit substrate, or as in FIG. 3, the couch controller TC and the CPU 1 may be separately mounted on the circuit substrate PCB while the display controller DC may be mounted on the display panel PNL in a chip-on-glass (COG) manner. Or, as in FIG. 4, the CPU 1 alone may be mounted on the circuit substrate PCB while the touch controller TC and the display controller DC may be mounted on the display panel PNL in a COG manner.

Figure 5:
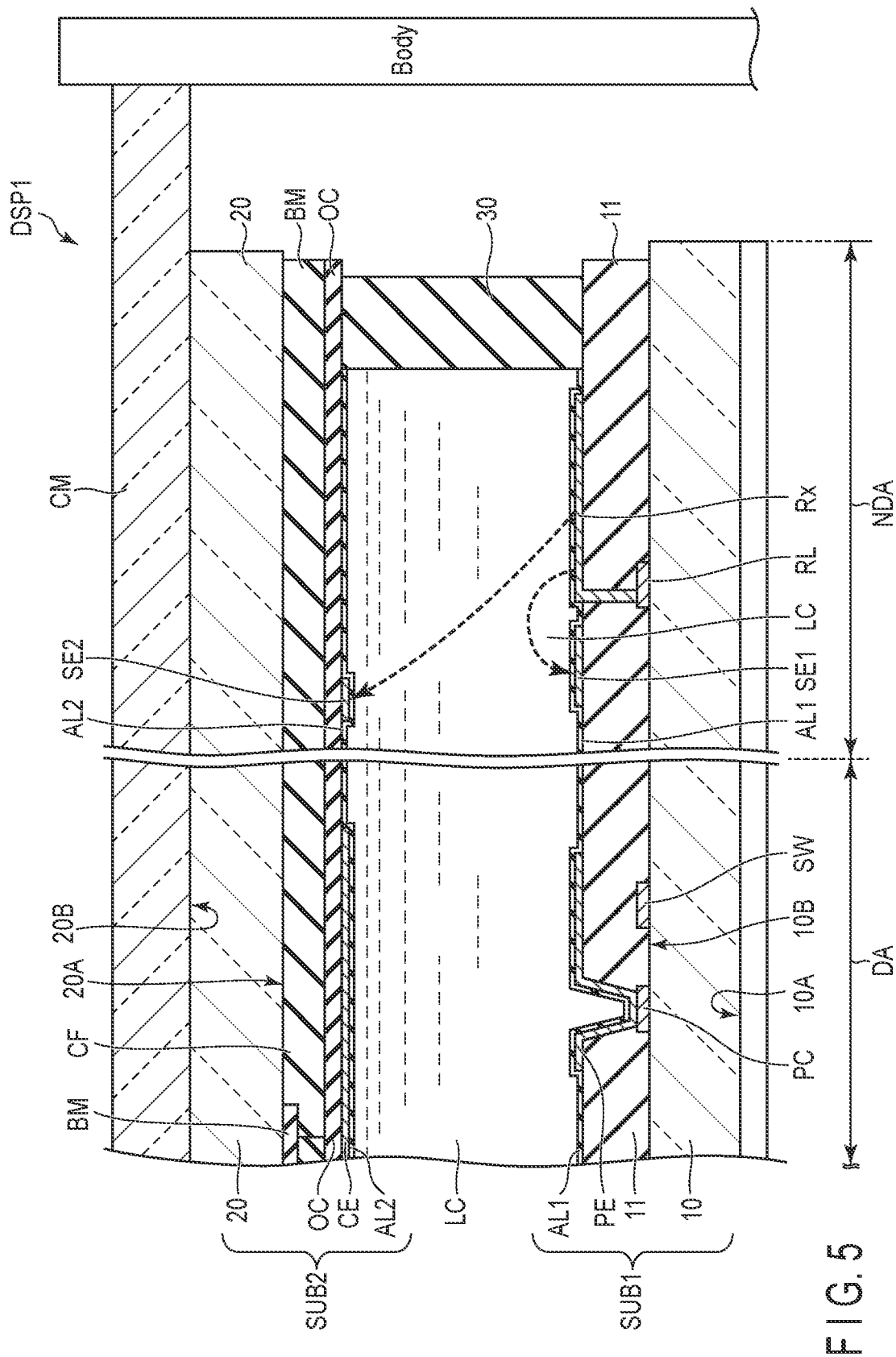
FIG. 5 is a cross-sectional view of a structural example of the display device of the first embodiment.

FIG. 5 is a cross-sectional view of a structural example of the display device DSP1 of the present embodiment. Hereinafter, each of the structure in the display area DA side and the structure in the non-display area NDA will be explained.

The display device DSP1 includes a first substrate SUB1, second substrate SUB2, sealant 30, liquid crystal layer LC, and cover member CM. The first substrate SUB1 and the second substrate SUB2 are formed in a flat plate shape parallel to the X-Y plan. The first substrate SUB1 and the second substrate SUB2 overlap with each other in a plan view, and are adhered to each other by the sealant 30. The liquid crystal layer LC is held between the first substrate SUB1 and the second substrate SUB2, and is sealed by the sealant 30. The sealant 30 contains a conductive member which is not shown (conductive beads coated with a metal), and thereby, the structure in the first substrate SUB1 side and the structure in the second substrate SUB2 side are electrically connected.

Note that, although this is not shown in FIG. 5, a polarizer is disposed below the first substrate SUB1. Similarly, although this is not shown in FIG. 5, a polarizer is interposed between the second substrate SUB2 and the cover member CM.

Furthermore, in FIG. 5, the display device DSP1 is a reflective type display device in which a backlight unit is not disposed; however, the display device DSP1 may be a display device utilizing organic ELs as pixels thereof, or a transmissive display device with a backlight unit. Or, the display device DSP1 may be a transflective type display device. Various types of backlight units can be used as the backlight unit, which is, for example, a backlight unit utilizing light emitting diodes (LEDs) as a light source thereof, or a backlight unit utilizing a cold-cathode fluorescent tube (CCFL).

In the display area DA side, the first substrate SUB1 includes, as in FIG. 5, a transparent substrate 10, switching element SW, pixel circuit PC, planarization film 11, pixel electrode PE, and alignment film AL1. The first substrate SUB1 includes, in addition to the aforementioned structure, scan lines G and signal lines S as in FIG. 1, too; however, they are omitted from the depiction of FIG. 5.

The transparent substrate 10 includes a main surface (lower surface) 10A and a main surface (upper surface) 10B opposite to the main surface 10A. The switching element SW and the pixel circuit PC are arranged in the main surface 10B side. The planarization film 11 is formed of one or more insulating films, and covers the switching element SW and the pixel circuit PC. The pixel electrode PE is arranged on the planarization film 11, and is connected to the pixel circuit PC via a contact hole formed in the planarization film 11. The switching element SW, pixel circuit PC, and pixel electrode PE are arranged in each segment pixel SG. The alignment film AL1 covers the pixel electrode PE and contact the liquid crystal layer LC.

Note that, in FIG. 5, the depiction of the switching element SW and the pixel circuit PC is simplified; however, in reality, the switching element SW and the pixel circuit PC include semiconductor layers and electrodes in each layer. Furthermore, although this is not shown in FIG. 5, the switching element SW and the pixel circuit PC are electrically connected. Furthermore, as aforementioned, the scan lines G and the signal lines S which are omitted from the depiction of FIG. 5 are disposed between the transparent substrate 10 and the planarization film 11, for example.

In the display area DA side, the second substrate SUB2 includes, as in FIG. 5, a transparent substrate 20, light shielding film BM, color filter CF, overcoat layer OC, common electrode CE, and alignment film AL2.

The transparent substrate 20 includes a main surface (lower surface) 20A and a main surface (upper surface) 20B which is opposite to the main surface 20A. The main surface 20A of the transparent substrate 20 is opposed to the main surface 10B of the transparent substrate 10. The light shielding film BM defined the segment pixels SG. The color filter CF is disposed in the main surface 20A side of the transparent substrate 20, is opposed to the pixel electrode PE, and partly overlaps with the light shielding film BM. The color filter CF includes, for example, red, green, and blue color filters. The overcoat layer OC covers the color filter CF. The common electrode CE is disposed over a plurality of segment pixels SG (a plurality of pixels PX), and is opposed to a plurality of pixel electrodes PE in the third direction Z. The common electrode CE is disposed on the overcoat layer OC. The alignment film AL2 covers the common electrode CE, and contacts the liquid crystal layer LC.

The liquid crystal layer LC is disposed between the main surface 10A and the main surface 20A.

The transparent substrates 10 and 20 is an insulating substrate such as a glass substrate or a plastic substrate. The planarization film 11 is formed of a transparent insulating material such as silicon oxide, silicon nitride, silicon oxynitride, or acrylic resin. For example, the planarization film 11 contains an inorganic insulating film and an organic insulating film. The pixel electrode PE is formed as a reflective electrode, and is, for example, a triple-layer structure of indium zinc oxide (IZO), silver (Ag), and indium zinc oxide (IZO). The common electrode CE is a transparent electrode formed of a transparent conductive material such as indium tin oxide (ITO) and indium zinc oxide (IZO). The alignment films AL1 and AL2 are horizontal alignment films exerting an alignment restricting force which is substantially parallel to the X-Y plan. The alignment restricting force may be achieved through a rubbing treatment or an optical alignment treatment.

In the non-display area NDA side, the first substrate SUB1 includes, as in FIG. 5, the transparent substrate 10, Rx wiring RL, planarization film 11, detection electrode Rx, first shield electrode SE1, and alignment film AL1. In the following description, the structure in the display area DA side which has been explained above will be omitted.

The main surface 10B side of the transparent substrate 10 includes the Rx wiring RL. The detection electrode Rx is disposed on the planarization film 11, and is connected to the Rx wiring RL through a contact hole formed in the planarization film 11. Note that the detection electrode Rx may be disposed in the second substrate SUB2 side. In that case, the detection electrode Rx extends to the sealant 30, and is electrically connected to Rx terminal and Rx wiring disposed in the first substrate SUB1 side via conductive beads contained in the sealant 30.

The first shield electrode SE1 is disposed on the planarization film 11. The first shield electrode SE1 is disposed to be adjacent to the detection electrode Rx at a certain interval. The first shield electrode SE1 is disposed on a side of the display area DA with respect to the adjacent detection electrode Rx. The first shield electrode SE1 is disposed in the same layer as with the pixel electrode PE in the display area DA side, and is formed of the same transparent conductive material used for the pixel electrode PE, for example. The first shield electrode SE1 is, in a cross-section which is different from the cross-section of FIG. 5, connected to a shield wiring which is not shown through a contact hole formed in the planarization film 11. To the first shield electrode SE1, a GND voltage or a predetermined direct current voltage is applied via the aforementioned shield wiring. Thus, the first shield electrode SE1 can suppress capacity coupling of the detection electrode Rx to other structures (for example, pixel electrode PE and the common electrode CE disposed in the display area DA).

The alignment film AL1 covers the detection electrode Rx and the first shield electrode SE1, and contacts the liquid crystal layer LC.

In the non-display area NDA side, the second substrate SUB2 includes, as in FIG. 5, the transparent substrate 20, light shielding film BM, overcoat layer OC, second shield electrode SE2, and alignment film AL2. In the following description, the structure in the display area DA side which has been explained above will be omitted.

The main surface 20A of the transparent substrate 20 includes the light shielding film BM. The light shielding film BM is disposed over substantially the entirety of the non-display area NDA. The overcoat layer OC covers the light shielding film BM with the color filter CF. The second shield electrode SE2 is disposed on the overcoat layer OC. The second shield electrode SE2 is, in a plan view, disposed on a side of the display area DA with respect to the detection electrode Rx. The second shield electrode SE2 is disposed in the same layer as with the common electrode CE in the display area DA side, and is formed of the same transparent conductive material used for the common electrode CE, for example. The second shield electrode SE2 extends, in a cross-section which is different from the cross-section of FIG. 5, to the sealant 30, and is electrically connected to shield terminal and shield wiring disposed in the first substrate SUB1 side through the conductive beads contained in the sealant 30. To the second shield electrode SE2, a GND voltage or a predetermined direct current voltage is applied via the shield terminal, shield wiring, and conductive beads. Thus, the second shield electrode SE2 can suppress capacity coupling of the detection electrode Rx to other structures (for example, the pixel electrode PE and the common electrode CE disposed in the display area DA).

Note that, in FIG. 5, the second shield electrode SE2 overlaps with the first shield electrode SE1 in a plan view; however, the second shield electrode SE2 may not overlap with the first shield electrode SE1 in a plan view. Furthermore, in FIG. 5, the second shield electrode SE2 does not overlap with the detection electrode Rx; however, the second shield electrode SE2 may partly overlap with the detection electrode in a plan view. Note that, in consideration of touch detection, the second shield electrode SE2 is preferred to avoid overlapping with the detection electrode Rx in a plan view.

The alignment film AL2 covers the second shield electrode SE2 and contacts to the liquid crystal layer LC.

Note that, in FIG. 5, among two liquid crystal modes classified by application direction of the field therein to change alignment of liquid crystal molecules of the liquid crystal layer LC, a vertical field mode is utilized. However, the present embodiment is applicable to a horizontal field mode. The vertical field mode includes, for example, a twisted nematic (TN) mode, and vertical alignment (VA) mode. Furthermore, the horizontal field mode includes, for example, an in-plane switching (IPS) mode, a fringe field switching (FFS) mode which is a kind of the IPS mode. If the horizontal field mode is utilized, the common electrode CE disposed in the display area is provided with the first substrate SUB1 side to be opposed to the pixel electrode PE via a thin insulating layer.

Now, advantages of the display device DSP1 of the present embodiment will be explained with reference to a comparative example. Note that, the comparative example here is used for explanation of a part of the advantages achievable by the display device DSP1 of the present embodiment, and advantages achievable by both the comparative example and the present embodiment are not excluded from the scope of the invention of the present application.

A display device DSP1' of the comparative example does not include a first shield electrode SE1 or a second shield electrode SE2 as in FIG. 6, and in this respect, it differs from the display device DSP1 of the embodiment of FIG. 5.

In the display device DSP1' of the comparative example, the electrodes are opposed and adjacent to each other, and thus, as depicted by the dotted arrows of FIG. 6, fringe fields are formed between the detection electrode Rx and the pixel electrode PE and the common electrode CE. The fringe field is influenced by a change in the alignment state of liquid crystal molecules contained in the liquid crystal layer LC when an image is displayed. Because of the above influence, the detection electrode Rx may erroneously detect a change in capacitance of the liquid crystal molecules as dielectrics, and touch detection may be erroneously caused.

In contrast, the display device DSP1 of the present embodiment includes the first shield electrode SE1 and the second shield electrode SE2 between the detection electrode Rx and the display area DA, and thus, as depicted by the dotted arrows of FIG. 5, a fringe field formed between the detection electrode Rx and the pixel electrode PE and the common electrode CE can be shielded by the first shield electrode SE1 and the second shield electrode SE2. In other words, with the first shield electrode SE1 and the second shield electrode SE2, generation of a fringe field between the detection electrode Rx and the pixel electrode PE and the common electrode CE can be suppressed. In that case, even if the alignment state of liquid crystal molecules contained in the liquid crystal layer LC is changed according to the image display, the detection electrode Rx is not easily influenced thereby, and a change of the capacitance between Rx and SE1 and between Rx and SE2 can be suppressed. Therefore, erroneous touch detection mentioned above can be prevented.

Second Embodiment

Figure 7:
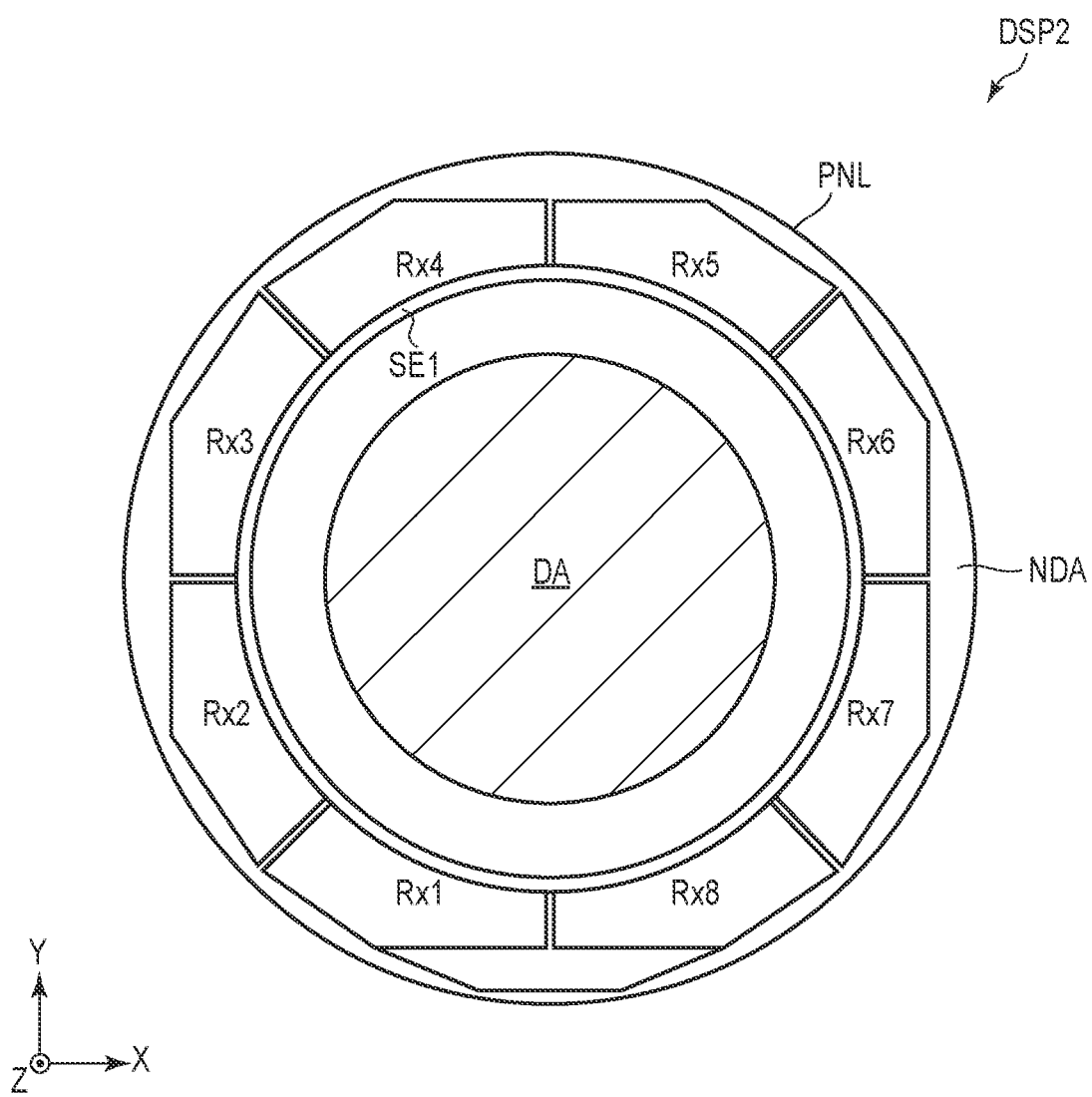
FIG. 7 is a plan view of a structural example of a display device of a second embodiment.
Figure 8:
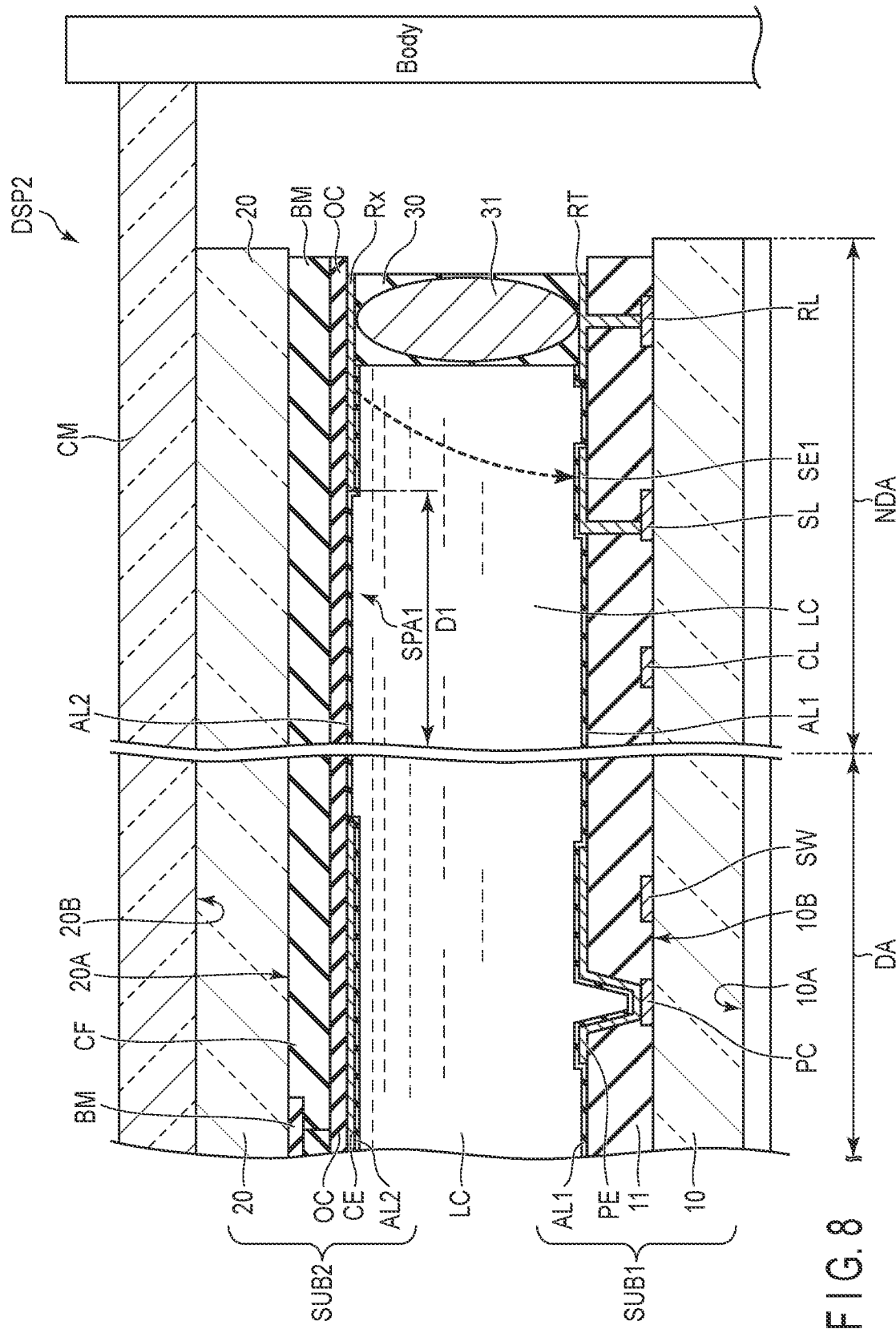
FIG. 8 is a cross-sectional view of a structural example of the display device of the second embodiment.

Now, a second embodiment will be explained. FIG. 7 is a plan view of a structural example of a display device DSP2 of the second embodiment. FIG. 8 is a cross-sectional view of a structural example of the display device DSP2 of the second embodiment.

The display device DSP2 of the second embodiment does not include a second shield electrode SE2 but includes a space SPA1 of certain distance D1 between a detection electrode Rx and a display area DA as in FIGS. 7 and 8, and in this respect, it differs from the above first embodiment. Furthermore, the display device DSP2 of the second embodiment includes, as in FIG. 8, the detection electrode Rx in a second substrate SUB2 side, and in this respect, it differs from the above first embodiment. Furthermore, the display device DSP2 of the second embodiment includes, as in FIG. 8, a circuit wiring CL (bezel wiring) on a main surface 10B of a transparent substrate 10, and in this respect, it differs from the above first embodiment. Note that the circuit wiring CL is, for example, a wiring used for displaying an image, such as a signal line S.

As in FIG. 8, the detection electrode Rx is disposed on the overcoat layer OC, and extends to an area overlapping with a sealant 30 in a plan view. The detection electrode Rx is electrically connected to an Rx terminal RT disposed on a planarization film 11 via conductive beads 31 contained in the sealant 30. The Rx terminal RT is connected to an Rx wiring RL disposed on the main surface 10B of the transparent substrate 10 via a contact hole formed in the planarization film 11.

Furthermore, in the cross-section of FIG. 8, the first shield electrode SE1 is connected a shield wiring SL disposed on the main surface 10B of the transparent substrate 10 via a contact hole formed in the planarization film 11.

A space SPA1 between the detection electrode Rx and the display area DA is set to have an optional distance D1 between 10 and 400 µm, or preferably, between 50 and 200 µm. In that case, a sufficient gap can be defined between the detection electrode Rx, and the pixel electrode PE and the common electrode CE, and a fringe field between the detection electrode Rx, and the pixel electrode PE and the common electrode CE can be suppressed.

Note that, as long as generation of a fringe field between the detection electrode Rx, and the pixel electrode PE and the common electrode CE is sufficiently suppressed with the first shield electrode SE1, the space SPA1 of the detection electrode Rx and the display area DA may be set smaller than the aforementioned ranges.

Figure 9:
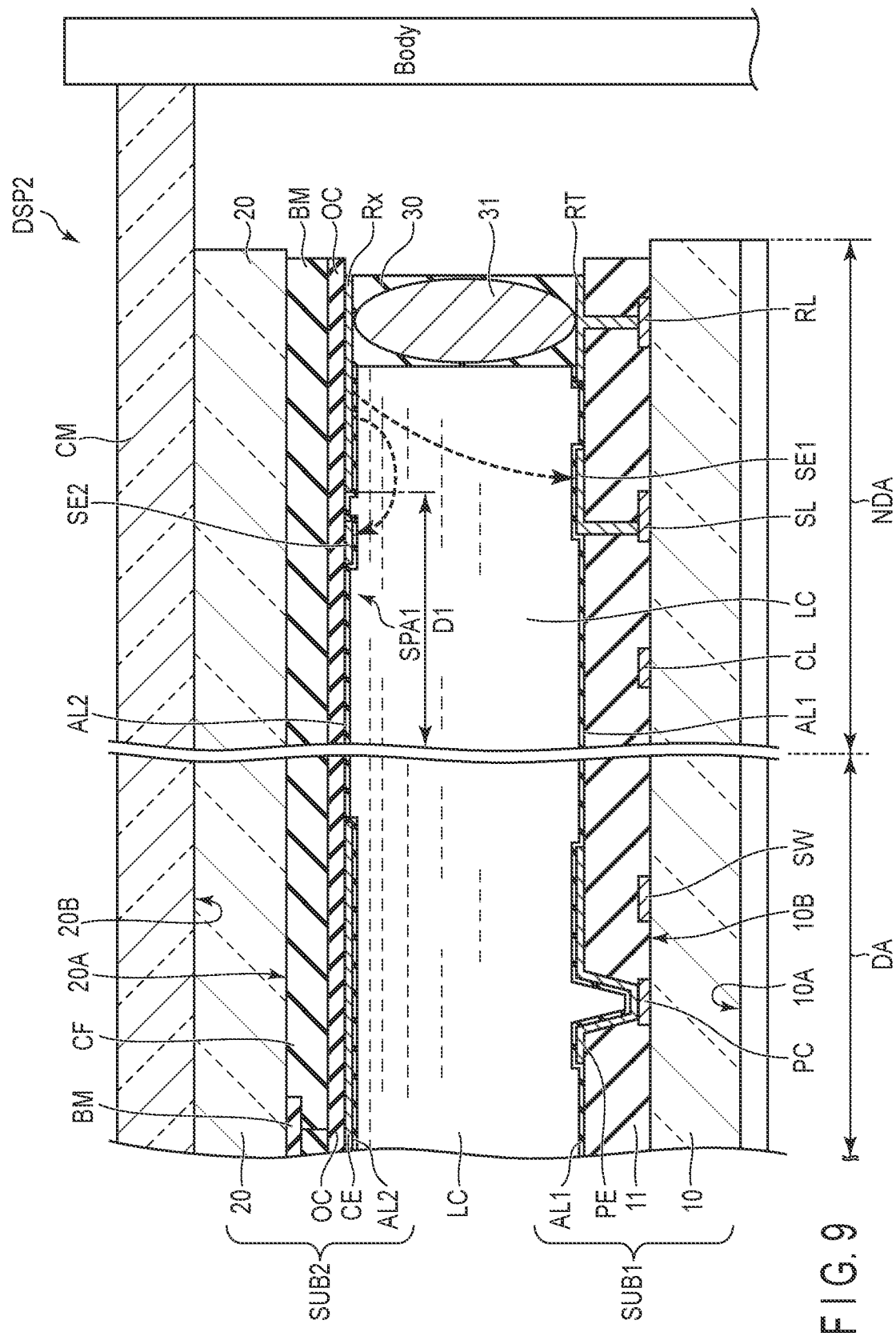
FIG. 9 is a cross-sectional view of another structural example of the display device of the second embodiment.

Note that, as in FIG. 9, while the space SPA1 is defined between the detection electrode Rx and the display area DA, a second shield electrode SE2 may further be disposed in the space SPA1. In that case, generation of a fringe field between the detection electrode Rx, and the pixel electrode PE and the common electrode CE can further be suppressed.

Now, advantages of the display device DSP2 of the present embodiment will be explained with reference to a comparative example. Note that, the comparative example here is used for explanation of a part of the advantages achievable by the display device DSP2 of the present embodiment, and advantages achievable by both the comparative example and the present embodiment are not excluded from the scope of the invention of the present application.

A display device DSP2' of the comparative example does not include a first shield electrode SE1 as in FIG. 10, and in this respect, it differs from the display device DSP2 of the embodiment of FIG. 8.

In the display device DSP2' of the comparative example, a sufficient gap is defined between the detection electrode Rx and the display area DA as with the display device DSP2 of the present embodiment, and thus, a fringe field generated between the detection electrode Rx, and the pixel electrode PE and the common electrode CE can be suppressed as well. However, in the display device DSP2' of the comparative example, since the electrodes are opposed to each other, as depicted by the dotted arrows of FIG. 10, fringe fields are formed between the detection electrode Rx and the circuit wiring CL. The fringe field is influenced by a change in a potential of the circuit wiring CL when an image is displayed. Because of the above influence, the detection electrode Rx may erroneously detect a change in capacitance of the liquid crystal molecules as dielectrics, and touch detection may be erroneously caused.

In contrast, the display device DSP2 of the present embodiment includes the first shield electrode SE1 between the detection electrode Rx and the circuit wiring CL, and thus, as depicted by the dotted arrows of FIG. 8, a fringe field formed between the detection electrode Rx and the circuit wiring CL can be shielded by the first shield electrode SE1. In other words, with the first shield electrode SE1, generation of a fringe field between the detection electrode Rx and the circuit wiring CL can be suppressed. In that case, even if a potential of the circuit wiring CL is changed according to the image display, the detection electrode Rx is not easily influenced thereby, and a change of the capacitance between Rx and SE1 can be suppressed. Therefore, erroneous touch detection mentioned above can be prevented.

Third Embodiment

Figure 11:
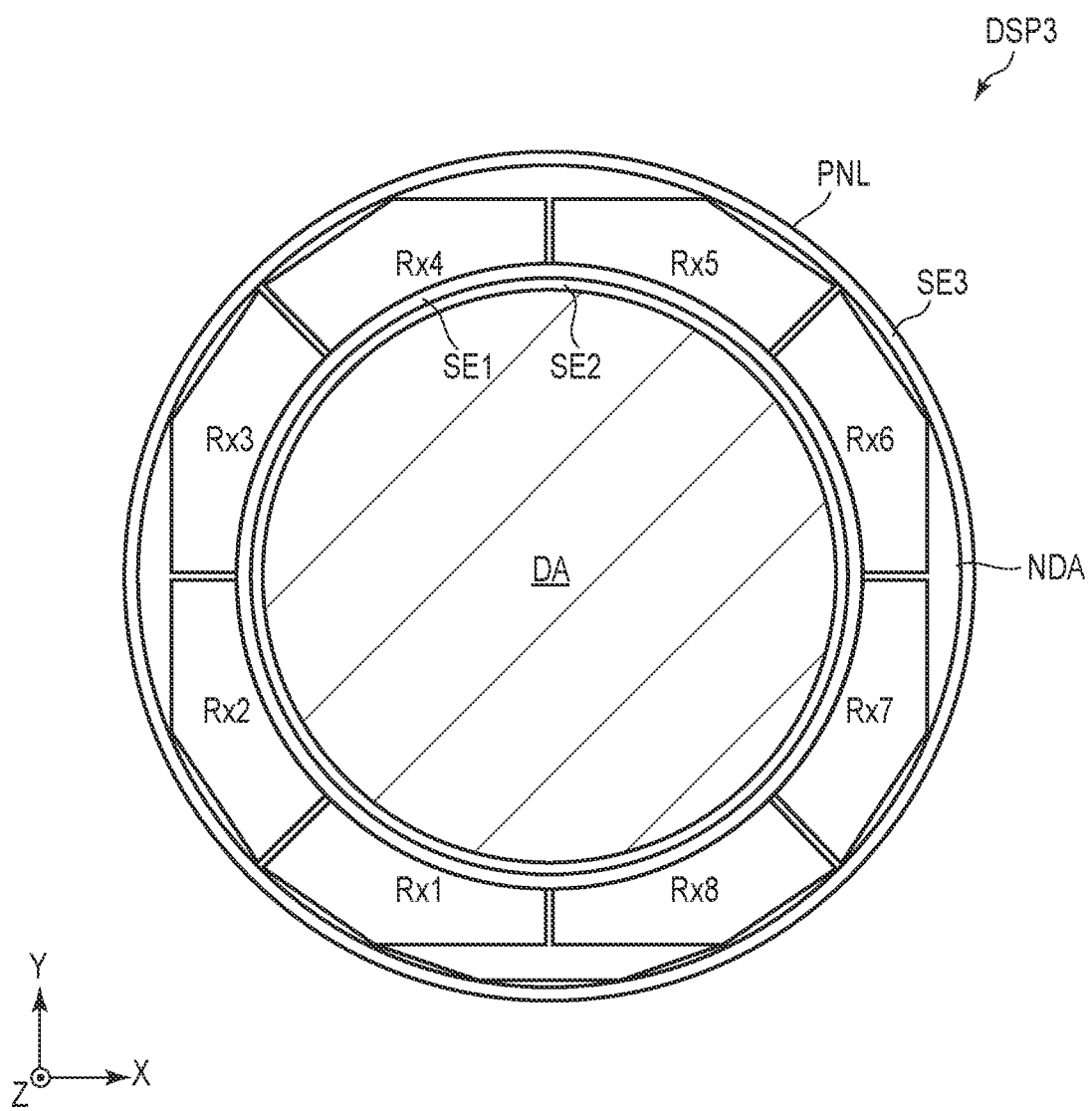
FIG. 11 is a plan view of a structural example of a display device of a third embodiment.
Figure 12:
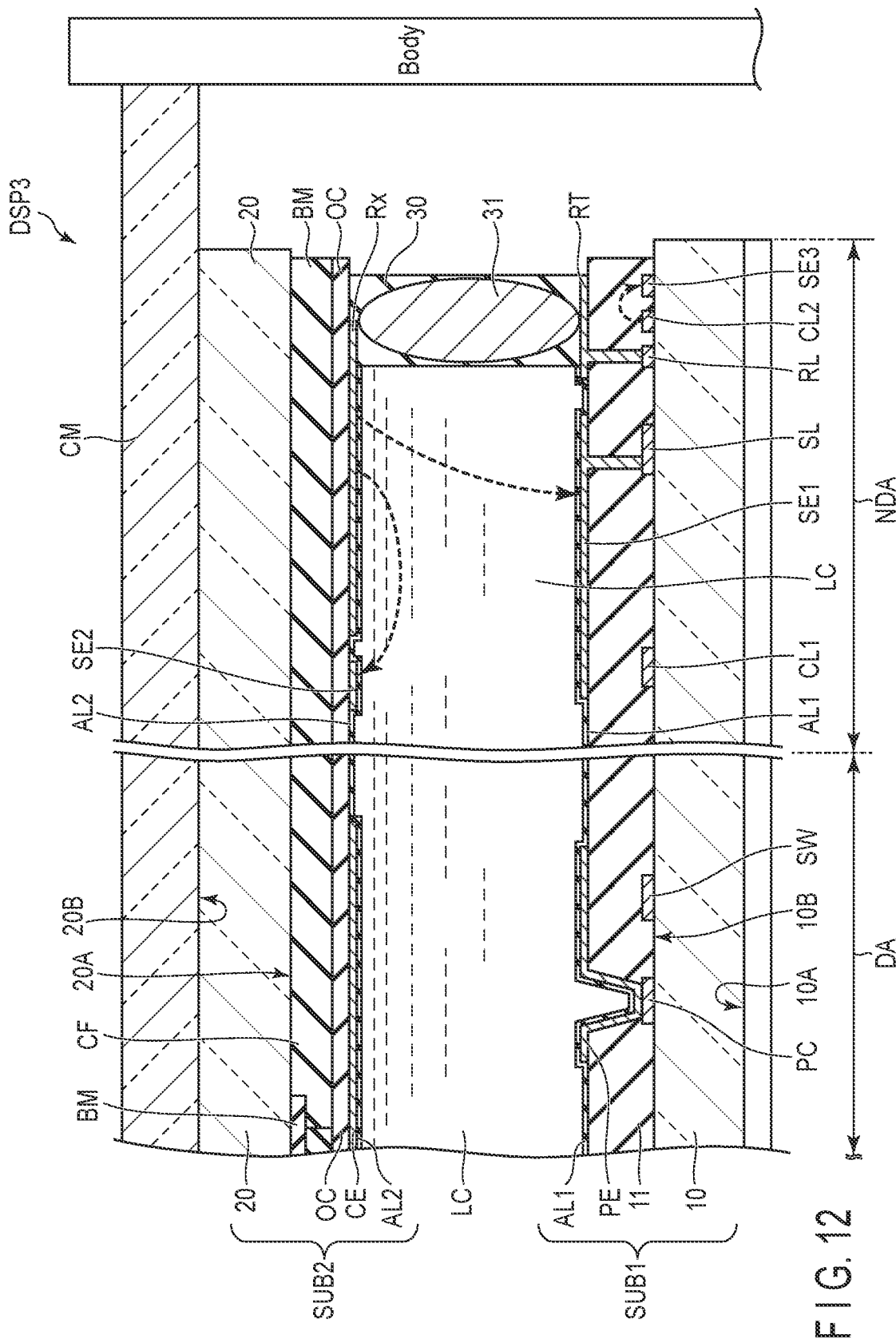
FIG. 12 is a cross-sectional view of a structural example of a display device of the third embodiment.

Now, a third embodiment will be explained. FIG. 11 is a plan view of a structural example of a display device DSP3 of the third embodiment. FIG. 12 is a cross-sectional view of a structural example of the display device DSP3 of the third embodiment.

The display device DSP3 of the third embodiment includes a third shield electrode SE3 which is disposed to surround a detection electrode Rx as in FIGS. 11 and 12, and in this respect, it differs from the above first embodiment. Furthermore, the display device DSP3 of the third embodiment includes, as in FIG. 12, the detection electrode Rx in a second substrate SUB2 side, and in this respect, it differs from the above first embodiment. Furthermore, the display device DSP3 of the third embodiment includes, as in FIG. 12, a first circuit wiring CL1 and a second circuit wiring CL2 on a main surface 10B of a transparent substrate 10, and in this respect, it differs from the above first embodiment. Note that the circuit wirings CL1 and CL2 are, for example, wirings used for displaying an image, such as signal lines S.

As described above, the first circuit wiring CL1 is disposed on the main surface 10B of the transparent substrate 10. The first shield electrode SE1 is disposed on the planarization film 11, and overlaps with the first circuit wiring CL1 in a plan view. In that case, generation of a fringe field between the detection electrode Rx and the first circuit wiring CL1 can be suppressed, and erroneous touch detection caused by a change in a potential of the first circuit wiring CL1 can be suppressed. Note that, the first shield electrode SE1 shall be disposed between the detection electrode Rx and the first circuit wiring CL1 in the third direction Z, and thus, the first shield electrode SE1 and the first circuit wiring CL1 does not necessarily overlap with each other in a plan view.

As in FIG. 12, the second circuit wiring CL2 is disposed in the same layer as with the first circuit wiring CL1. The second circuit wiring CL2 is disposed on an outer side of the first circuit wiring CL1. Specifically, the second circuit wiring CL2 is disposed in a position to overlap with the sealant 30 in a plan view.

As described above, the third shield electrode SE3 is disposed to surround the detection electrode Rx. As in FIG. 12, the third shield electrode SE3 is disposed in the same layer as with the second circuit wiring CL2. The third shield electrode SE3 is disposed on an outer side of the second circuit wiring CL2.

As in FIG. 12, the detection electrode Rx is disposed on the overcoat layer OC, and extends to an area overlapping with the sealant 30 in a plan view. The detection electrode Rx is electrically connected to an Rx terminal RT disposed on the planarization film 11 via conductive beads 31 contained in the sealant 30. The Rx terminal RT is connected to an Rx wiring RL disposed on the main surface 10B of the transparent substrate 10 via a contact hole formed in the planarization film 11.

Now, advantages of the display device DSP3 of the present embodiment will be explained with reference to a comparative example. Note that, the comparative example here is used for explanation of a part of the advantages achievable by the display device DSP3 of the present embodiment, and advantages achievable by both the comparative example and the present embodiment are not excluded from the scope of the invention of the present application.

A display device DSP3' of the comparative example does not include a third shield electrode SE3 while a second circuit wiring CL2 is disposed on an outer side of that of the display device DSP3 of the present embodiment (specifically, in a position where a third shield electrode SE3 of the display device DSP3 is arranged), and in this respect, it differs from the display device DSP3 of the embodiment of FIG. 12.

In the display device DSP3' of the comparative example, as depicted by dotted arrows of FIG. 13, a fringe field (in other words, a sneaking field via air layer) is generated between the second circuit wiring CL2 and the detection electrode Rx. The fringe field is influenced by a change in a potential of the second circuit wiring CL2 when an image is displayed. In such a case, the detection electrode Rx may erroneously detect a change in capacitance of the liquid crystal molecules as dielectrics, and touch detection may be erroneously caused.

In contrast, the display device DSP3 of the present embodiment includes the third shield electrode SE3 on an outer side of the second circuit wiring CL2, and thus, as depicted by the dotted arrows of FIG. 12, a fringe field formed between the second circuit wiring CL2 and the detection electrode Rx can be shielded by the third shield electrode SE3. In other words, with the third shield electrode SE3, generation of a fringe field between the second circuit wiring CL2 and the detection electrode Rx can be suppressed. In that case, even if a potential of the second circuit wiring CL2 is changed according to the image display, the detection electrode Rx is not easily influenced thereby, and a change of the capacitance between Rx and SE3 can be suppressed. Therefore, erroneous touch-detection mentioned above can be prevented.

Note that, in the present embodiment, as in FIGS. 11 and 12, the second shield electrode SE2 is disposed between the detection electrode Rx and the display area DA; however, instead of the second shield electrode SE2, a space with a predetermined distance (specifically, space of 10 to 400 μm, or preferably, 50 to 200 μm) may be defined therebetween. Furthermore, in addition to the space with a predetermined distance defined between the detection electrode Rx and the display area DA, the second shield electrode SE2 may further be disposed in the space. In that case, the third shield electrode SE3 is still disposed on an outer side of the second circuit wiring CL2, and thus, the above-described advantage can be achieved.

Figure 14:
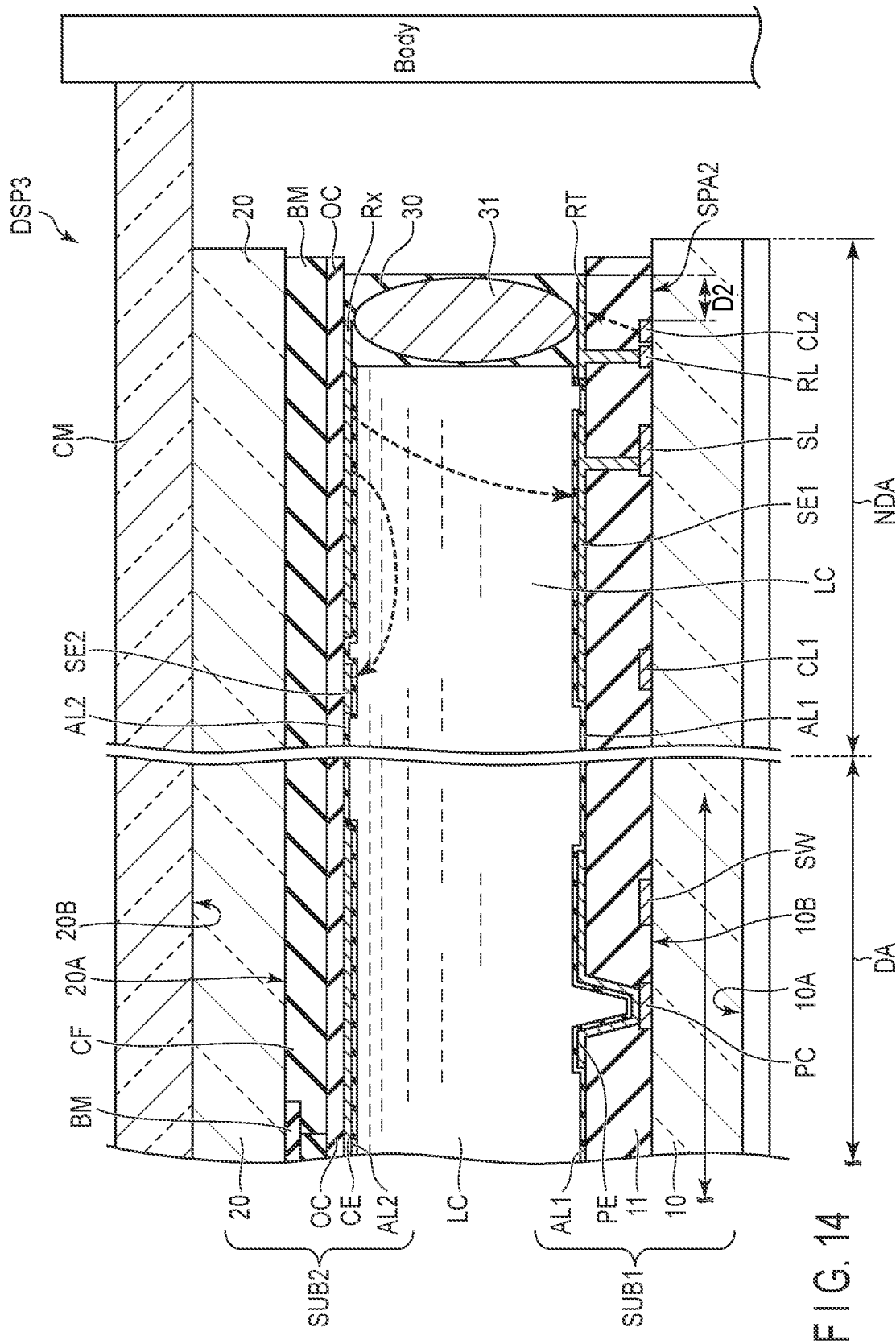
FIG. 14 is a cross-sectional view of another structural example of the display device of the third embodiment.

Furthermore, in the present embodiment, as in FIGS. 11 and 12, the third shield electrode SE3 is disposed on an outer side of the second circuit wiring CL2; however, as in FIG. 14, the second circuit wiring CL2 may be arranged as inner side as possible to define a space SPA2 with a predetermined distance D2 (specifically, space of 10 to 400 μm, or preferably, 50 to 200 μm) therebetween, instead of the third shield electrode SE3. In that case, a sufficient gap can be defined between the second circuit wiring CL2 and the detection electrode Rx (in other words, between the second circuit wiring CL2 and the outermost end of the sealant 30), and thus, generation of a fringe field between the second circuit wiring CL2 and the detection electrode Rx can be suppressed. Thus, erroneous touch detection mentioned above can be prevented.

Figure 15:
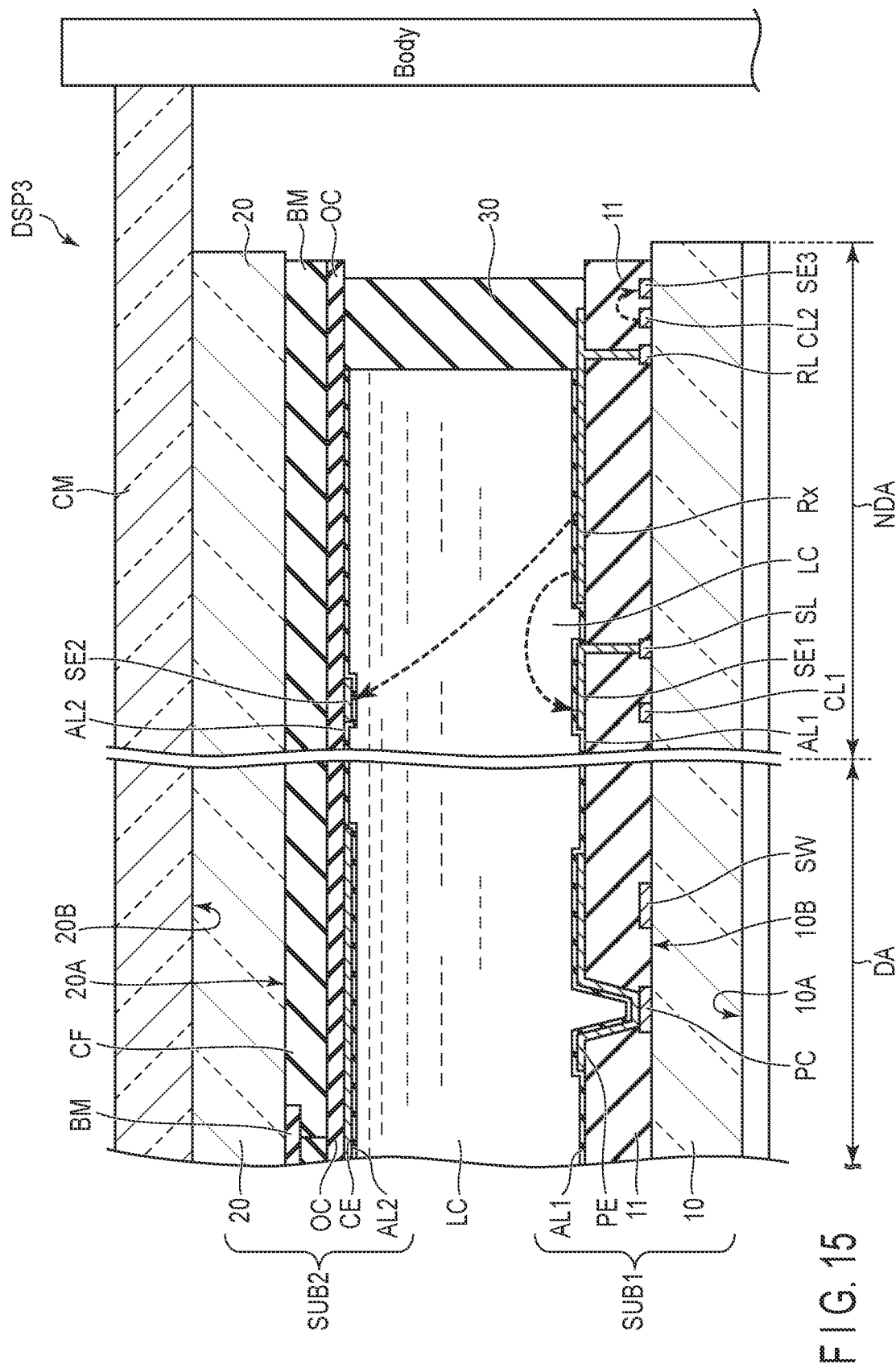
FIG. 15 is a cross-sectional view of another structural example of the display device of the third embodiment.

Furthermore, in the present embodiment, as in FIG. 12, the detection electrode Rx is disposed in the second substrate SUB2 side; however, as in FIG. 15, the detection electrode Rx may be disposed in the first substrate SUB1 side. In that case, the third shield electrode SE3 is still disposed on an outer side of the second circuit wiring CL2, and thus, the above-described advantage can be achieved.

Figure 16:
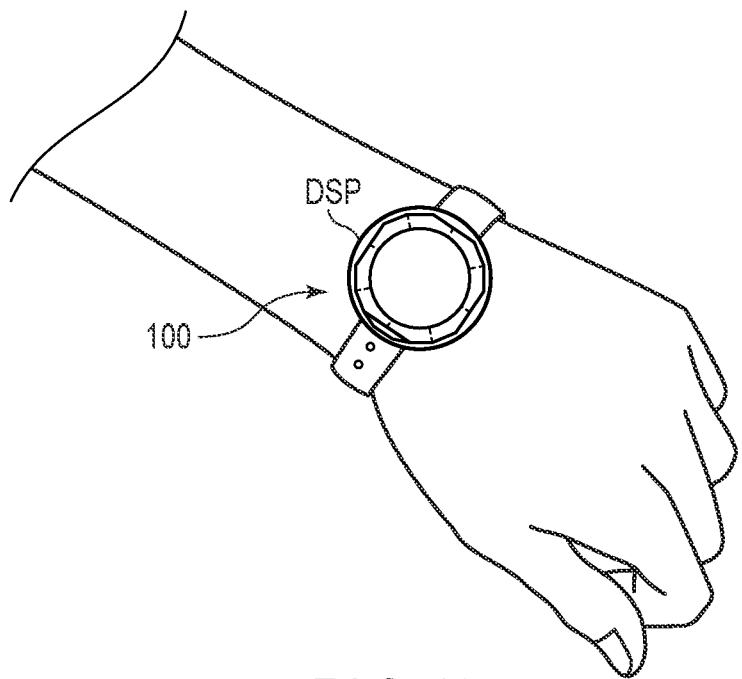
FIG. 16 illustrates an application example of the display device of each embodiment.

FIG. 16 illustrates an example of application of the display device DSP of the embodiments. As in FIG. 16, the display device DSP is applied to a wrist watch 100, for example. In that case, time and the like will be displayed in the display part DA of the display device DSP, and the display device DSP detects certain movements (for example, one clockwise circling movement around the circumferential part of the watch, or one counterclockwise movement around the circumferential part of the watch, or tapping) upon touching on the detection electrodes in the non-display area NDA, and executes an operation corresponding to the detected movement.

Figure 17:
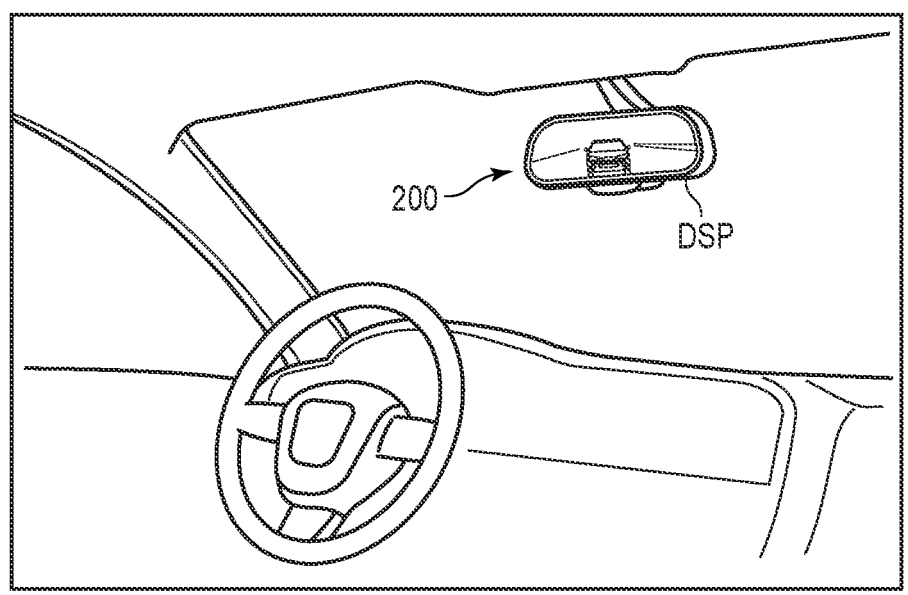
FIG. 17 illustrates another application example of the display device of each embodiment.

FIG. 17 illustrates another example of application of the display device DSP of the embodiments. As in FIG. 17, the display device DSP is applied to an in-car rearview mirror 200, for example. In that case, a rearview image of the car captured by a camera equipped in the car and the like will be displayed in the display area DA of the display device DSP, and the display device DSP detects certain movement upon touching on the detection electrodes in the non-display area NDA, and executes an operation corresponding to the detected movement.

Figure 18:
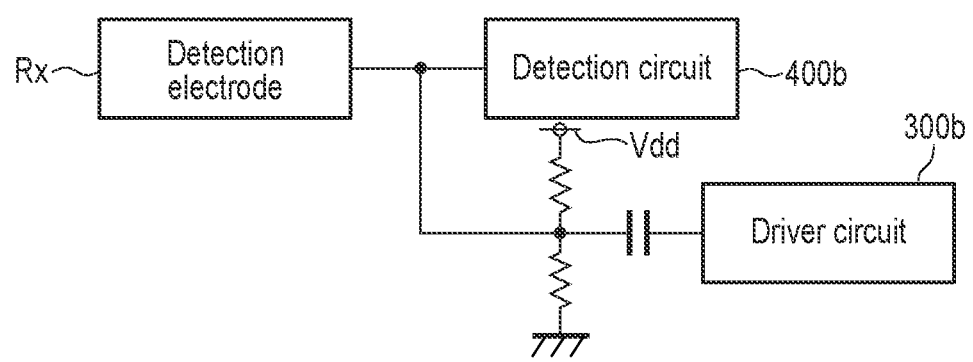
FIG. 18 illustrates an example of mechanism of self-capacitive type touch sensing.

FIG. 18 illustrates an example of the mechanism of touch detection through a self-capacitive method. A voltage of a power source Vdd is divided by resistor dividing and is supplied to the detection electrode Rx as a bias voltage.

From the driver circuit 300b, a certain wave-form drive signal is supplied to the detection electrode Rx through capacitance coupling or the like, and a certain wave-form detection signal is read from the detection electrode Rx. At that time, if capacitance by a finger or the like is loaded to the detection electrode Rx, amplitude of the detection electrode changes. In the example of FIG. 18, the amplitude of the detection electrode Rx decreases. Thus, in the equivalent circuit of FIG. 18, a detection circuit 400b detects the amplitude of the detection electrode Rx to detect approaching or touching external object such as a finger. Note that, the self-detection circuit is not limited to the circuit of FIG. 18, and any circuit method which can detect the presence of an external object such as a finger with only the detection electrode may be adopted.

According to an embodiment, a display device DSP includes, in both a first substrate SUB1 and a second substrate SUB2, a shield electrode SE or a space with a predetermined gap corresponding to the dimension of the shield electrode SE between a detection electrode Rx and a display area DA. Thus, capacitance coupling of the detection electrode Rx to other components can be suppressed, and thus, erroneous touch detection can be prevented. Furthermore, the display device DSP may include a shield electrode SE or a predetermined gap corresponding to the dimension of the shield electrode SE in the outermost end of a sealant 30. Thus, a sneaking field can be suppressed, and thus, erroneous touch detection can be prevented.

Furthermore, if a fringe field is generated between the detection electrode Rx and the components of the display area DA (for example, pixel electrode PE, common electrode CE, and the like), in addition to the aforementioned erroneous touch detection, there may be a change in alignment state of liquid crystal molecules contained in the liquid crystal layer LC in the display area DA side, and the display quality may be deteriorated; however, according to an embodiment, capacitance coupling of the detection electrode Rx to other components can be suppressed, and therefore, such deterioration in the display quality can be suppressed.

As can be understood from the above, according to the above-described embodiments, a display device and a watch which can achieve both display quality when displaying images and excellent operability by touch can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a first substrate;
a second substrate opposed to the first substrate;
a liquid crystal layer held between the first substrate and the second substrate;
a plurality of detection electrodes disposed in a peripheral area surrounding a display area configured to display an image;
a first shield electrode disposed on the first substrate and to surround the display area in the peripheral area, the first shield electrode having a predetermined fixed potential; and
a second shield electrode disposed on the second substrate and to surround the display area in the peripheral area, the second shield electrode having the predetermined fixed potential, wherein
the first shield electrode and the second shield electrode are disposed, in a plan view, between the display area and the detection electrodes, and
the first shield electrode and the second shield electrode do not overlap with the detection electrodes in a plan view.

2. The display device of claim 1, wherein
the first substrate includes a transparent substrate, a wiring layer disposed on the transparent substrate, and a planarization film covering the wiring layer, and
each of the detection electrodes is disposed on the planarization film.

3. The display device of claim 1, wherein
the first substrate includes a transparent substrate, a wiring layer disposed on the transparent substrate, and a planarization film covering the wiring layer; and
each of the detection electrodes is disposed on the second substrate.

4. The display device of claim 1, wherein
the first substrate includes a pixel electrode disposed in the same layer as with the first shield electrode, and
the second substrate includes a common electrode disposed in the same layer as with the second shield electrode.

5. The display device of claim 1, wherein
the predetermined fixed potential is the same potential as with each of the detection electrodes.

6. The display device of claim 1, wherein
the predetermined fixed potential is a direct current potential of predetermined value.

7. The display device of claim 1, wherein
the first substrate includes a pixel electrode disposed in the same layer as with the first shield electrode, and
the pixel electrode includes a reflective electrode.

8. A watch comprising the display device of claim 1.

9. A display device comprising:
a first substrate;
a second substrate opposed to the first substrate;
a liquid crystal layer held between the first substrate and the second substrate;
a plurality of detection electrodes disposed in a peripheral area surrounding a display area configured to display an image;
a first shield electrode disposed on the first substrate and in at least the peripheral area, the first shield electrode having a predetermined fixed potential; and
a second shield electrode disposed on the second substrate and in at least the peripheral area, the second shield electrode having the predetermined fixed potential, wherein
the first shield electrode and the second shield electrode are disposed, in a plan view, between the display area and the detection electrodes,
the first substrate includes a pixel electrode disposed in the same layer as with the first shield electrode, and
the pixel electrode includes a reflective electrode.

* * * * *